Nov. 4, 1969     F. BENDE ET AL     3,476,804
METHOD FOR THE PRODUCTION OF ADIPIC ACID AND RECOVERY
OF NITRIC ACID COMPONENTS
Filed June 14, 1966     2 Sheets-Sheet 1

INVENTORS
FRIEDRICH BENDE
HEINZ VOLLINGER
KURT POHL

BY *McCarthy, Depaoli & O'Brien*
ATTORNEYS

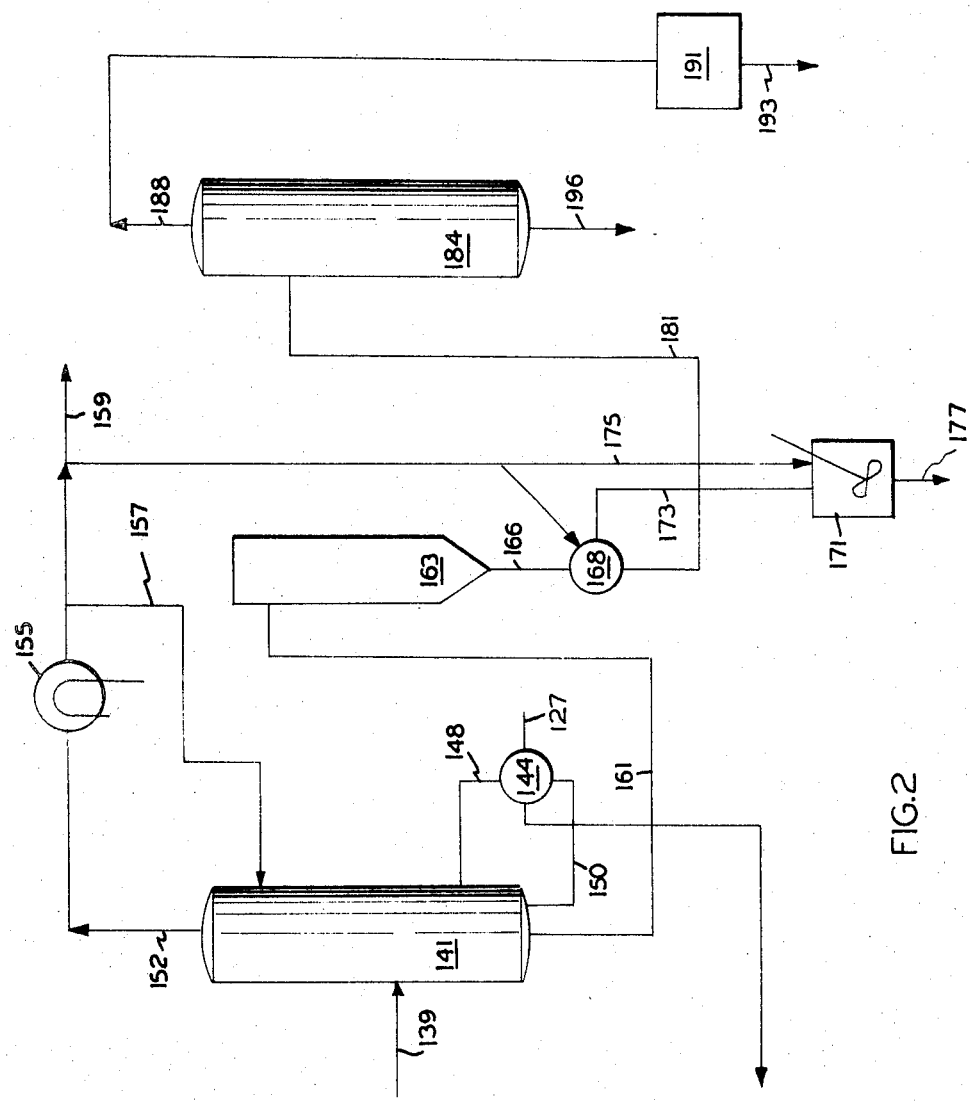

United States Patent Office 3,476,804
Patented Nov. 4, 1969

3,476,804
METHOD FOR THE PRODUCTION OF ADIPIC ACID AND RECOVERY OF NITRIC ACID COMPONENTS
Friedrich Bende, Bergen-Enkheim, and Heinz Vollinger and Kurt Pohl, Offenbach (Main), Germany, assignors to Vickers-Zimmer Aktiengesellschaft Planung und Bau von Industrieanlagen, a corporation of Germany
Filed June 14, 1966, Ser. No. 557,539
Int. Cl. C07c 55/14, 51/28
U.S. Cl. 260—531          3 Claims

ABSTRACT OF THE DISCLOSURE

A process for recovery of adipic acid and removal of nitric acid components from the product stream of the oxidation mixture resulting from the oxidation of cylohexanol and cyclohexanone with concentrated nitric acid, wherein the product stream contains 12 to 18 weight percent adipic acid and about 70–90 weight percent of the concentrated nitric acid oxidant, the steps which include diluting the product stream to a nitric acid concentration of about 38% by weight of the addition of recycled aqueous adipic acid solution and a bottoms fraction recovered from a later concentration, crystallizing coarse crystals of adipic acid from the 38% by weight nitric acid stream under vacuum at a temperature of about 35° C., centrifuging the resulting crystal slurry at about 35° C. to give a crystal cake and a dilute nitric acid-containing mother liquor, separating the crystal cake from the dilute nitric acid-containing mother liquor, concentrating the nitric acid-containing mother liquor by removing water and chilling to produce further adipic acid crystals.

---

Figure 1:
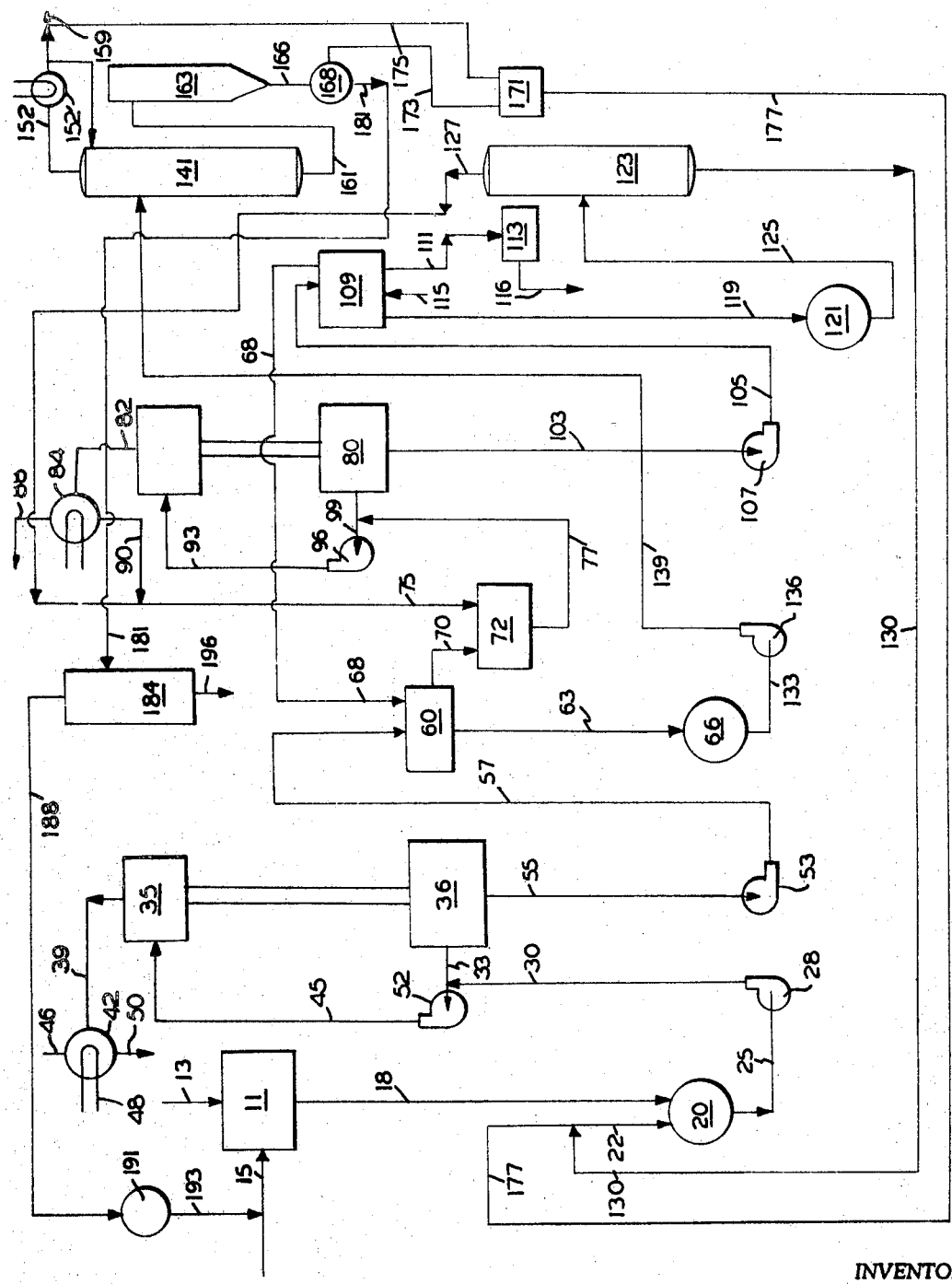

This invention is concerned with the production of adipic acid and in particular is concerned with the recovery of adipic acid from a liquid reaction product mixture.

Particular problems are involved in the recovery of adipic acid from the nitric acid oxidation process. In this process a mixture of cyclohexanol and cyclohexanone which usually contain other partially oxidized adipic acid precursors is contacted intimately with an aqueous nitric acid reagent under defined conditions of temperature, pressure and residence time. It has been found that temperatures in the range of about 40° C. to 90° C., preferably 60° C. to 80° C., and pressures sufficient to maintain the liquid phase give efficient results in the amount of conversion of the precursor mixture (anolone) and in the selectivity of the conversion to adipic acid. See U.S. Patent No. 2,703,331.

The reaction product of this oxidation contains adipic acid and a number of by-products. From a typical nitric acid oxidation reaction, the liquid product may contain about 12 to 18, say about 14.5 or more percent by weight adipic acid along with about 1 to 2 percent by weight glutaric, succinic and oxalic acids and other by-products, the remainder being a 25–50% nitric acid solution. In addition, a gaseous product comprising mostly nitrous oxides are produced, which also contain nitric oxide, nitrogen, carbon dioxide, etc.

This invention is a method for recovering adipic acid from this reaction mixture in a substantially pure state whereby it may be readily employed in typical uses of this dibasic acid, including uses demanding high purity, for example, as a polymerization feedstock in nylon production or as an intermediate in the production of hexamethylenediamine, the other monomer component for nylon production.

The art has devoted considerable attention to the recovery of pure adipic acid from the above described reaction product; the methods previously proposed have, in general, sought to recover adipic acid from the reaction product solution by concentrating the solution to a point where it is supersaturated with regard to adipic acid. The adipic acid crystallizes out from this mixture and the crystals are recovered, perhaps after a recrystallization from water. In addition, the mother liquor from the supersaturated solution is usually treated for further crystallization of adipic acid and recovery thereof.

For example, U.S. Patent 2,703,331 proposes the crystallization of adipic acid from the nitric acid mother liquor, followed by recrystallization from water and recovery of further adipic acid from the mother liquor. The process of this patent, however, requires a good deal of manipulation of the reactor effluent before it is ready to be sent to crystallization. These manipulations include an air treatment step and a separate concentration step before passage of the adipic acid-containing material to the crystallization. Also, some of the art, notably, U.S. Patents 2,713,067 and 2,813,122 prescribe temperatures higher than 40° C. as the best temperatures for crystallization of adipic acid. While the aforementioned U.S. Patent 2,713,067 recognizes the need for production of coarse crystals if subsequent filtration procedures are to be effective, this patent requires recrystallization to take place from a diluted nitric acid solution, a step which is not feasible on a commercial basis.

This invention is based, in part, on the discovery that an oxidation product stream, regulated to contain about 70–90% of the nitric acid concentration originally in the oxidation product stream may be vcauum crystallized at about 35° C. to produce coarse crystals of adipic acid which may be removed from mother liquor by centrifugation without a need for complicated and expensive filtration procedures. This crystal product may be redissolved in distilled water and subjected to recrystallization at about 52° C. and again centrifuged at about this temperature to produce adipic acid crystals in good yield and of a purity sufficient for immediate drying and passage to adiponitrile or polyamide polymer production. Preferably the concentration of the adipic acid solution in each crystallization, to give "supersaturated" solutions, takes place within the crystallizers themselves, the solvent being evaporated from the crystallizers by the application of vacuum. Usually each crystallization is maintained at about 20 to 80 mm./Hg absolute pressure. The mother liquor from the first crystallization is treated for nitric acid recovery and the rest of this nitric acid mother liquor including the adipic acid, is returned to the first vacuum crystallization step. Since the oxidation reaction product often has a concentration of about 45% by weight nitric acid, this return of adipic acid in water obtained from the mother liquor, serves to adjust the nitric acid to the concentration desired.

The invention will be better understood by reference to the accompanying drawings in which FIGURE 1 is a flow sheet illustrating the first and second adipic acid crystallization features of this invention; and FIGURE 2 is an enlarged flow sheet of the nitric acid recovery system.

In the drawings, 11 is a reactor in which anolone (a mixture of cyclohexanol and cyclohexanone) from source 13 is contacted with a solution of nitric acid from line 15 to produce adipic acid. The aqueous nitric acid has a concentration of about 60% by weight of $HNO_3$. The reaction product contains about 44% by weight nitric acid along with water, adipic acid, catalysts and by-products. This reaction product is led by line 18 to storage tank 20 as described hereinafter. Sufficient water is supplied to the tank 20 by line 22 to give the stored product a concentration 70–90% of the nitric acid concentration originally present in the reaction product.

The stored mixture is conducted by line 25, pump 28, lines 30 and 33, pump 52 and line 45 to the crystallizer 36. The mixture in line 30 has a temperature of about 75° C. Crystals of adipic acid are formed in the crystallizer 36 by lowering the temperature of the mixture to about 35° C. at an absolute pressure of about 40 mm./Hg. Cooling and application of vacuum, as well as removal of nitric acid decomopsition vapors are accomplished by providing the crystallizer 36 with a line 39, the condenser 35, and the vacuum line 46. Application of vacuum to the line 46 causes a reduction in pressure in the crystallizer 36 and a vaporization of some liquid components in the crystallizer. These components, along with nitrogen oxide gases, pass upwardly through the line 39 and go through the heat exchanger 42 which is provided with a cooling fluid, e.g., water, in line 48. This cooling condenses some vapors from line 39 and the condensate is conducted to the storage tank 66 by line 50.

The slurry of coarse adipic acid crystals in nitric acid and water is removed from the bottom of the crystallizer 36 by pump 53 through lines 55 and 57 to centrifuge 60. This centrifuge preferably has a coarse screen suitable for handling a large flow of liquid. The dilute nitric acid-containing mother liquor which passes through the screen goes by line 63 to storage tank 66. Water from line 68 is used to wash the coarse adipic acid crystals in the centrifuge. The resulting wet washed adipic acid crystals pass by line 70 to the redissolver tank 72. Thus, the adipic acid is freed of its mixture with nitric acid.

The redissolver tank 72 is supplied with distilled water from line 75 and also may be steam-jacketed to bring the contents to a temperature of about 90° C. The solution of adipic material in water is conveyed by lines 77 and 99, pump 96 and line 93 to the second crystallizer 80 which may be maintained at a temperature, say of about 52° C., to insure crystallization of the adipic acid free from other components. The temperature is adjusted by passage of vapors from the crystallizer 80 upward through the line 82 and the heat exchanger 84 under the influence of a vacuum source leading to line 88. Condensate from the heat exchanger 84 is led back by lines 90 and 75 to the redissolver tank 72. The adipic acid crystal slurry from the bottom of the crystallizer 80 is conveyed by lines 103 and 105 and pump 107 to the second centrifuge 109, which operates at a temperature of about 52° C. Adipic acid crystals from this centrifuge are sent by line 111 to dryer 113, after being washed by water from line 115 which exits the centrifuge by line 68 for passage as wash water to the first centrifuge 60. Dried adipic acid crystal product is removed from the system at 116. The mainly water-containing mother liquor from centrifuge 109 passes by line 119 to storage tank 121 from whence it proceeds to column 123 by line 125 to supply distilled water for passage by lines 127 and 75 to the redissolver tank 72. The bottom effluent of column 123 being water with a higher concentration of adipic acid compared with the mother liquor is sent by line 130 to line 22 and to storage tank 20, whereby a dilution of the reaction product in storage tank 20 is achieved.

The mixture in storage tank 66 which consists primarily of water, nitric acid, a small amount of adipic acid, catalysts, and most of the by-product, is further processed by conveying it through line 133, pump 136 and line 139 to the nitric acid concentrator column 141. In this column, steam, preferably the overhead vapor of the distilled water supply column 123 entering heat exchanger 144 (see FIG. 2) from line 127 may be used to heat a bottoms recycle fraction circuating through lines 148 and 150 in the column to maintain a temperature at the bottom of about 75° C. The column is held under a vacuum so that the pressure at the bottom of the column is about 120 mm./Hg, absolute while the top of the column has a pressure of about 90 mm./Hg absolute and a temperature of about 50° C. Water vapor is removed at the top by line 152 and is condensed in the condenser 155. A portion of this condensed water is returned to the top of the column by line 157 as reflux. Another portion is removed from the system by line 159.

The bottoms from the concentrator column 141, which is a concentrated solution of nitric acid containing adipic acid, is withdrawn from the column 141 and passed by line 161 to the cooling crystallizer 163. This crystallizer held at a temperature of about 10° C. causes crystallization of remaining adipic acid and the resulting slurry of adipic acid crystals in concentrated nitric acid is sent by line 166 to filter 168. The adipic acid from this filtration is sent to redissolving tank 171 by line 173 where it is slurried and dissolved in water from lines 152 and 175. The resulting adipic acid solution passes by way of line 177 back to the reaction product storage tank 20.

The concentrated nitric acid-containing mother liquor from filter 168 passes by line 181 to the distillation column 184 which has a top maintained at about 90 mm./Hg absolute and 62° C., while the bottom is at 100 mm./Hg absolute and 90° C. The concentrated nitric acid passes out the top of the column 184 by way of line 188 to the storage tank 191. This nitric acid is of a concentration and purity suitable for passage by lines 193 and 15 back to the reactor 11. The column 184 is provided with a condenser and a reflux line as described with reference to column 141. By-products are removed from the nitric acid column 184 by line 196. These conveniently are sent to waste.

The following example illustrates the method of this invention but should not be considered limiting. A reactor wherein anolone is contacted with a 60% by weight nitric acid solution at 75° C. in the presence of a small catalytic amount of copper, iron and vanadate produces 80.6 gallons per minute of a product containing about 44% by weight nitric acid and about 17.9% by weight adipic acid. The reaction product is conducted to a storage tank along with 15.4 gallons per minute of an aqueous adipic acid solution obtained in later nitric acid recovery and 7.3 gallons per minute of a bottoms fraction recovered from concentration of the aqueous crystallization mother liquor. This mixture, containing about 38% by weight nitric acid based on nitric acid and water, 20% by weight adipic acid and 1.2% by weight impurities, including other dicarboxylic acids and catalyst, is passed to a crystallizer at about 103.3 gallons per minute.

The mixture reaches the crystallizer at a temperature of about 75° C. and during its passage through the crystallizer is connected by a plurality of lines to a source of vacuum maintained at 20 mm./Hg absolute pressure. 100 gallons per minute of slurry is drawn off from the crystallizer at 35° C. and this is fed to a centrifuge which separates out about 92 gallons of mother liquor per minute. The centrifuge is a screen centrifuge having openings of about 0.1 millimeter. The centrifuge discharges about 179 pounds per minute of crystals which have been washed with 7.5 gallons per minute of wash water from the second centrifuge.

The centrifuged crystals are redissolved in a tank which is supplied with 15.9 gallons per minute of distilled water condensed from the adipic acid dryer vapors, and with 6.8 gallons per minute of the second vacuum crystallizer overhead condensate and 21.2 gallons of water condensed from the overhead of the distilled water supply column and 5.2 gallons per minute of fresh demineralized water. The temperature of the water streams is such as to produce a temperature of about 80° C., in the redissolver tank. The redissolver tank supplies 68.4 gallons per minute of solution to the second stage crystallizer at a temperature of about 80° C.

The top of the crystallizer has tubes leading to a vacuum source maintained at 20 mm./Hg absolute pressure.

Vapors pass upwardly through these tubes and 6.8 gallons per minute water are condensed by indirect heat exchange with cooling water and returned to the adipic acid redissolving tank. The crystallizer produces 57.5 gallons of crystal slurry per minute and this slurry is centrifuged at 52° C. The centrifuge discharges about 162 pounds per minute of a wet adipic acid cake. This cake after washing is dried in a forced-air dryer at about 120° C. to give 140 pounds/minute of adipic acid crystals with a remaining water content less than 0.2% by weight which is sent to storage and 15.9 gallons per minute of condensed water which is sent to the redissolver tank.

The mother liquor from the second centrifuge step in an amount of 43.5 gallons per minute is sent to a concentractor. Overhead from this concentrator is sent to the recrystallizer, as mentioned, while the bottoms are sent to the reaction product storage tank where they lower the nitric acid concentration. The mother liquor from the first centrifuge stage is treated to concentrate and remove nitric acid, which is sent to the reactor. The adipic acid still remaining in the mother liquor is separated as mentioned, and is fed back as aqueous solution to the storage tank. The remaining mother liquor, containing nitric acid, a small amount of adipic acid and other impurities is sent to waste.

What is claimed is:

1. In a method for removal of nitric acid components from the product stream of a reaction wherein a mixture of cyclohexanol and cyclohexanone is oxidized with a concentrated nitric acid solution, said product stream containing about 12–18 weight percent adipic acid and about 70–90 weight percent of the concentrated nitric acid oxidant, the improvement which comprises diluting the product stream to a nitric acid concentration of about 38% by weight by the addition of recycled aqueous adipic acid solution and a bottoms fraction recovered from the later concentration of a nitric acid-containing mother liquor, crystallizing coarse crystals of adipic acid from the 38% by weight nitric acid stream under vacuum at a temperature of about 35° C., centrifuging the resulting crystal slurry at about 35° C. to give a crystal cake and a dilute nitric acid-containing mother liquor, separating said crystal cake from said dilute nitric acid-containing mother liquor, concentrating said mother liquor by removing water and chilling to produce further adipic acid crystals.

2. The method of claim 1 in which said further adipic acid crystals, separated from nitric acid, are dissolved in water and the resulting solution is passed to the step of diluting the said product stream.

3. The method of claim 1 in which the dilute nitric acid-containing mother liquor is concentrated in a column in the presence of heat to provide a concentrated nitric acid solution with removal of overhead water as vapor.

References Cited
UNITED STATES PATENTS

| | | | |
|---|---|---|---|
| 2,703,331 | 3/1955 | Goldbeck, et. al. | 260—533 |
| 2,191,786 | 2/1940 | Aronow | 260—531 |
| 3,102,908 | 9/1963 | Raynes | 260—531 X |
| 3,260,743 | 7/1966 | Hogeman | 260—533 |

LORRAINE A. WEINBERGER, Primary Examiner

D. STENZEL, Assistant Examiner

U.S. Cl. X.R.

260—537